April 8, 1947.   H. W. LEVERENZ   2,418,780
ALKALI HALIDE TARGET WITH CONTRASTING COLORS
Filed Nov. 28, 1942

INVENTOR
HUMBOLDT W. LEVERENZ
BY Charles McClair
ATTORNEY

Patented Apr. 8, 1947

2,418,780

UNITED STATES PATENT OFFICE 2,418,780

ALKALI HALIDE TARGET WITH CONTRASTING COLORS

Humboldt W. Leverenz, Princeton, N. J., assignor to Radio Corporation of America, a corporation of Delaware Application November 28, 1942, Serial No. 467,173

17 Claims. (Cl. 250—164)

My invention relates to methods and means for portraying intelligence and particularly to targets comprising materials which change color under electron bombardment, such as targets incorporating alkali halide crystals and their method of operation.

It is known that alkali halides, notably potassium chloride, have the property of developing color centers under electron bombardment. For example, when such an alkali halide target is scanned by an electron beam, electrons are injected into the crystal or crystals in the scanned area thereby developing a group of color centers of a density depending upon the instantaneous intensity of the electron beam. This coloration has been used to produce images for television and oscillograph purposes. The recent development of aircraft position and distance indicating equipment utilizing cathode ray tubes wherein the electron beam of the cathode ray tube is sequentially pulsed to form on the target a trace portraying intelligence, such as the trajectory of the aircraft, necessitates the development of high contrast between the areas of a target indicating aircraft position and distance with respect to the surrounding areas of the target. In addition, it is required to observe the trajectory as a visible trace during a relatively long period of time. Luminescent materials have been used for this application although the majority of such materials have a flash characteristic which tends to reduce the dark-adaptation of the eye. While a target of alkali halide material is ideally suited for this application, greater contrast between old or "remembered" information and newly received information is desired. One method of distinguishing newly received information from remembered information is described in my copending application, Serial No. 466,272 filed November 20, 1942.

It is an object of my invention to provide methods and means for increasing the visible contrast from an alkali halide target scanned by a cathode ray beam. It is another object to intensify the light output in pre-determined spectral regions from an alkali halide target and to provide an improved method of portraying intelligence and rendering such intelligence semi-permanent. It is a further object of my invention to increase the contrast between excited and nonexcited areas of such a target and to differentiate newly received information from information previously portrayed utilizing targets of the alkali halide type. These and other objects, features, and advantages of my invention will become apparent when considered in view of the following description and the accompanying drawing, wherein:

Figure 1:
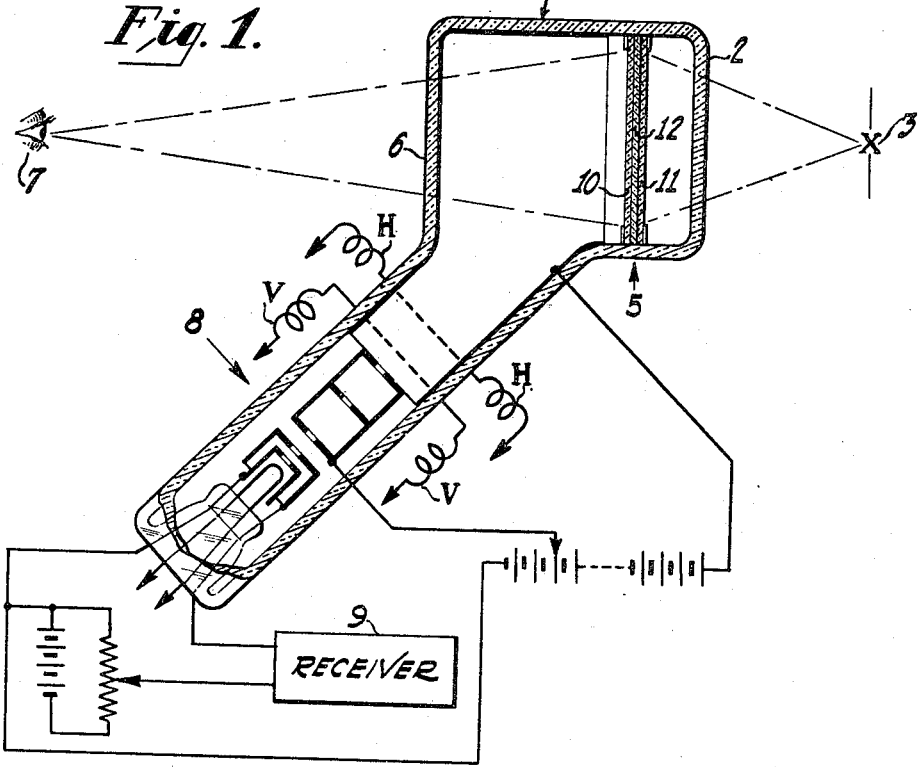
Figure 1 shows a cathode ray tube made in accordance with my invention.

I have shown in Figure 1 one type of cathode ray tube utilizing a target made and operated in accordance with my invention wherein the effect of the electron beam trace on the target may be viewed either by transmitted light and it should be understood that this showing of a tube is merely exemplary and various other modifications and arrangements may be utilized to an equal advantage as hereinafter explained. Referring to Figure 1, the tube comprises a highly evacuated envelope or bulb 1 of cylindrical shape with a neck or arm section enclosing a conventional electron gun. The cylindrical portion of the bulb 1 is provided at one end with a window 2 so that ultra-violet light from a substantially constant light source 3 may be projected through the window and upon a target 5 which may be supported independently of the envelope wall as shown or deposited directly upon the inner surface of the window 2. The effects of the trace on the target may be viewed through a second window 6, preferably from a position as at 7.

The electron gun assembly 8 may be of any one of the conventional types either of the magnetic focus or of the electrostatic focus type as shown. The electron beam developed by the electron gun 8 is modulated in intensity, such as by grid control from a receiver 9 and scanned over the target 5 by horizontal and vertical deflection coils H and V supplied with operating currents of the desired wave form depending upon the type of trace whether of circular, radial or rectangular form.

In accordance with my invention I utilize a light source capable of exciting to luminescence one of two portions of a luminescent screen comprising two different luminescent materials, or phosphors, to luminescence and I so choose the phosphor material of one of the screen portions to have a spectral emission characteristic falling within, corresponding to or substantially overlapping the spectral absorption characteristics of an associated alkali halide target. An alkali halide target of the potassium chloride type has a peak spectral absorption at approximately 5500 A. and in accordance with my invention I provide a phosphor exposed to the halide target, the said phosphor having an emission characteristic which peaks preferably at a corresponding frequency, such as at 5500 A. Further in accordance with my invention I provide a second luminescent screen portion of a phosphor having a differently colored luminescence than that of the first mentioned portion and having an emission band which is different than the absorption band of the alkali halide and preferably falls without the alkali halide absorption band.

Figure 2:
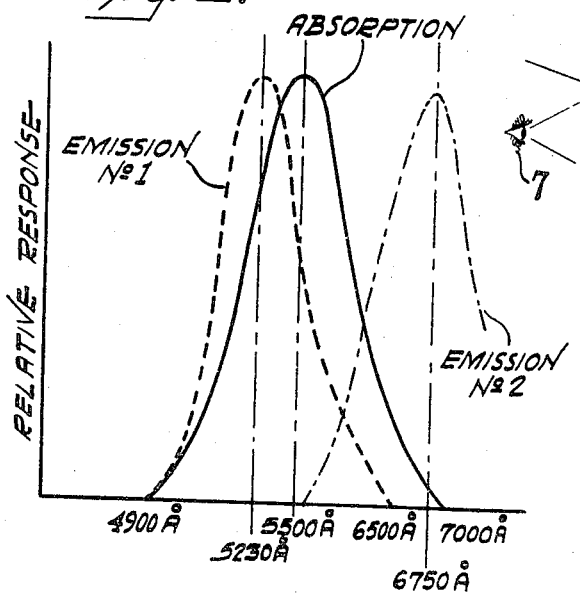
Figure 2 shows the characteristics of a target as shown in Figure 1.
Figure 3:
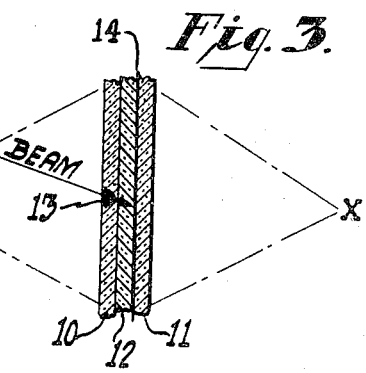
Figure 3 shows an enlarged fragmentary portion of a target made and operated in accordance with my invention.

Referring to Figure 2 the full line curve represents the absorption characteristic of an alkali halide, such as potassium chloride, the absorption extending over the range from 4900 A. to 7000 A. with its peak at 5500 A. I have shown also in Figure 2 in dashed outline a curve denoted as Emission No. 1, representative of the emission characteristic of a luminescent material forming one portion of my screen such as a manganese-activated alpha willemite, having an emission spectrum extending from approximately 4900 A. to 6500 A. and peaked at about 5230 A. The third curve in dash-dot outline denoted Emission No. 2 is representative of the second portion of my screen structure and is chosen to have an emission under corpuscular or cathode ray bombardment materially outside the absorption band of the alkali halide. As shown, the emission band of this portion extends from approximately 5500 A. to above 7000 A., peaking at approximately 6750 A. A suitable material is a copper or silver-activated zinc cadmium sulphide having a luminescence in the red portion of the spectrum. It will be noted from an examination of the curves shown in Figure 2 that the spectral emission curve of the phosphor, such as alpha willemite, is substantially coincident and substantially overlaps the spectral absorption curve of the halide, whereas that of the zinc cadmium sulphide screen portion does not materially overlap the halide absorption curve.

The light source 3 has a predominate emission in the absorption band of the first phosphor. A low-pressure mercury lamp, emitting predominantly at 2537 A., may be used to excite the manganese-activated alpha willemite. A medium pressure mercury lamp, such as the commercial H-4 type, having substantial emission at 3650 A., 5461 A., and 5790 A. is particularly suitable as an ultra-violet source to excite sulphide phosphors although other light sources such as a fluorescent lamp or screen having the required frequency band may be used.

Referring again to Figure 1, the target 5 may be deposited in one of several manners, either on the window 2 of the envelope 1, or upon a carrier such as a sheet of glass, not shown, to support the target 5 clear of the window. More particularly, as indicated above, the target 5 comprises in addition to the support, not shown, a crystal or layer of crystals of an alkali halide 10 and a dual phosphor screen comprising the first phosphor portion 11, and a second phosphor portion 12 between the portion 11 and the halide 10. For example, the first phosphor portion 11 may be deposited preferably by a settling operation followed by the deposition of the phosphor portion 12. This settling may comprise one operation wherein the materials are successively settled through a liquid suspension as disclosed by W. H. Painter in his application Serial No. 423,643, filed December 19, 1941. The alkali halide 10 may then be deposited by vaporization from a halide source allowing the vapor to condense on the exposed surface of the phosphor screen portion 12.

The advantages of my invention accrue from the fact that the halide 10 is sufficiently translucent to the electron beam from the electron gun 8 to allow penetration thereof by the beam into the phosphor portion 12 exciting this portion to luminescence under the beam. Simultaneously I excite the screen portion 11 such as by exposure to ultra-violet light from the source 3 to provide uniform illumination visible to the observer at the position 7. However, the alkali halide under the action of the electron beam produces color centers 13 which, since the emission band of the screen portion 11 overlaps the absorption band of the halide when excited to form color centers, absorbs the light from the screen portion 11 thereby developing a dark trace. This dark trace is persistent for a period of from a number of seconds to several minutes depending upon the time required for the dissipation of the color centers. However, in accordance with my invention, the beam not only develops the color centers in the halide 10, but likewise develops luminescence at the point of penetration and incidence upon the screen portion 12. The material of the screen portion 12 however is chosen to have an emission band such as shown by the dot-dash curve of Figure 2 lying without the absorption band of the halide. Consequently, the luminescence developed by the phosphor portion 12 is not absorbed by the color centers 13 but is transmitted to the observer through the color centers. Consequently, the presence of the electron beam is denoted by the flash of luminescence from the screen portion 12 followed by the dark trace produced by the color centers 13.

Preferably the material of the phosphor portion 12 is chosen to have low phosphorescent persistence following excitation by the beam to prevent reduction in contrast betwen the areas of the halide having color centers and the surrounding illumination provided by the screen portion 11. Furthermore, a selective barrier layer 14, pervious to the luminescence from 12, may be provided between these two portions to prevent penetration of electrons through the phosphor portion 12 and upon the portion 11. Depending upon the initial beam velocity, the penetration effect may be minimized by providing a relatively thick phosphor layer adjacent the halide. Similarly, the barrier layer 14 may be of material absorbent to the ultra-violet light from the source 3 to prevent incidence on and consequent excitation of the phosphor portion 12. Such a selective barrier layer may comprise a silicate such as potassium or sodium silicate deposited upon the screen portion 11 prior to the deposition of the portion 12 and the halide target 10. However, the barrier layer 14 may comprise a thin sheet of mica or glass which is impervious to the electron beam as well as to the ultra-violet light from the source 3. Alternatively, the phosphor portion may be relatively thick so that substantially all of the ultra-violet light from the source 3 is absorbed. It will be appreciated that the choice of phosphor material for the portion 11 may be made so that its emission spectrum lies without the luminescent absorption spectrum of the phosphor portion 12 to prevent excitation thereof and consequent reduction in contrast inasmuch as the color centers are substantially transparent to light from the phosphor portion 12.

I have referred above to two particular phosphor materials suitable for forming the phosphor screen portions 11 and 12 as comprising manganese-activated alpha zinc silicate and silver-activated zinc cadmium sulphide respectively. Assuming a potassium chloride target 10 further specific examples of suitable phosphor material combinations are:

| Phosphor layer 11 | Phosphor layer 12 |
| --- | --- |
| ZnS (90-80%) CdS (10-20%):Cu<br>ZnS (55-45%) CdS (45-55%):Ag<br>α—Zn$_2$GeO$_4$:Mn<br>ZnS (≈60%) ZnSe (≈40%):Ag | ZnS:Ag<br>MgWO$_4$<br>ZnBeSiO$_4$:Mn<br>CdB$_2$O$_4$:Mn |

The above phosphor materials may be used interchangeably although oxygen-containing phosphors are best excited by 2537 A. ultra-violet, while the sulphides are best excited by 3650 A. ultra-violet.

While I have described my invention with particular reference to a halide comprising potassium chloride, it will be appreciated that other halides or other reversibly colorable materials may be used to substantially equal advantage and the principles above set forth as to the choice of the phosphor emission band with respect to the halide absorption band is equally valid for other halides in addition to potassium chloride and for other substances, such as magnesium oxide, which may be similarly reversibly colored by corpuscular or undulatory energy. Consequently, I do not wish to be limited to the specific structures and constituents or to the mode of operation except as specifically set forth and limited in the appended claims.

I claim:

1. Cathode ray apparatus comprising an evacuated envelope, means to develop an electron beam, a target capable of developing color centers when impinged by said electron beam, a luminescent screen of material having a luminescence emission band substantially without the light absorption of said halide target when impinged by said beam in a position to be excited by a portion of said beam following impingement on said target, and a second luminescent screen of material having a luminescence emission band overlapping the light absorption band of said target positioned to develop light incident on said target.

2. Cathode ray apparatus comprising an evacuated envelope, means to develop an electron beam, a pair of coextensive luminescent screens having different luminescence emission wavelength bands, and an alkali halide target having a light absorption band overlapping the emission band of one of said screens positioned between the said means and the other of said screens.

3. Cathode ray apparatus comprising an evacuated envelope, means within said envelope to develop an electron beam, an alkali halide target of insufficient thickness to absorb said beam exposed to said means, a luminescent screen positioned to be impinged by said beam following penetration of said target, said screen having a luminescence emission band of longer wavelength than the absorption band of said target when impinged by said beam, a second luminescent screen adjoined the side of said first mentioned screen opposite said target, said second screen having an emission band overlapping the absorption band of said target, and means between said screens to prevent incidence of said beam on said second screen.

4. Cathode ray apparatus as claimed in claim 3 wherein said screens are rendered luminescent under ultra-violet light and said last mentioned means is highly absorbent to ultra-violet light.

5. The combination with a target having the property of absorbing light in accordance with the intensity of incident energy of a luminescent screen having an emission band in the absorption band of said target, and a second luminescent screen adapted to be excited by a portion of said incident energy having an emission band substantially without the absorption band of said target whereby the light developed by said second screen is substantially unabsorbed by said target.

6. The combination with a target having the property of developing color centers when subjected to electron bombardment of a luminescent screen adjacent said target having an emission band substantially without the absorption band of said color centers and a second luminescent screen exposed to said target having an emission band extending within the absorption band of said color centers.

7. The combination with an alkali halide target adapted to develop color centers when bombarded by an electron beam of a luminescent screen adjacent said target having a luminescence wavelength overlapping the light absorption wavelength of said alkali halide target and a luminescent screen having a luminescence wavelength substantially without the absorption wavelength of said target positioned between said first mentioned screen and said target.

8. The combination with a potassium chloride target adapted to be bombarded with cathode rays to develop light-absorbing color centers therein of a luminescent screen having a yellow-blue fluorescence to illuminate said target and a second luminescent screen having a red-yellow fluorescence between said screen and said target whereby simultaneous cathode ray excitation of said target and said second screen by cathode rays produces substantial emission of yellow-red fluorescence visible through said target and simultaneous substantial absorption of yellow-blue fluorescence.

9. The combination comprising a substantially translucent film of an alkali halide, a pair of luminescent screens optically exposed to said film, said screens lying to one side of said film, the screen nearest adjacent the said film having a spectral emission characteristic substantially without the spectral absorption characteristic of said film, the other of said screens having a spectral emission characteristic substantially within the spectral absorption characteristic of said film.

10. The method of portraying intelligence comprising producing color centers having a predetermined spectral opacity wavelength band over an area, illuminating said area with luminescent light having a spectral band at least including the spectral opacity wavelength of said produced color centers, and developing luminescence over the area of said color centers of a wavelength substantially without said opacity wavelength band whereby intelligence is portrayed by the selective absorption and transmission of light by said color centers.

11. The method of portraying intelligence comprising producing a succession of displaced spectrally opaque color centers representative of the intelligence to be portrayed, projecting luminescent light having a frequency band including the opaque spectral band of said color centers upon said developed color centers, intercepting said light over the area of said color centers, developing luminescence without the absorption band of said color centers, and projecting said light through said color centers whereby intelligence is portrayed both by the transmission and absorption of said developed color centers.

12. The method of developing an instantaneous and semi-permanent record of intelligence comprising developing a succession of displaced color centers having a predetermined spectral opacity, in a time and spatial sequence representative of the intelligence to be recorded, projecting luminescent light having a spectral band width including a portion of the spectral opacity band width of said color centers upon said developed color centers, intercepting said light with said color centers, and transmitting light of a different color than said luminescent light through said color centers whereby the transmission through said color centers represents an instantaneous record and the light intercepted by said color centers represents a semi-permanent record of said intelligence.

13. In a cathode ray device for portraying signals, means for producing a cathode beam, means for varying the intensity of said beam by said signals, a translucent target adapted to develop momentary opacity for a predetermined wave band of light upon bombardment by the electrons of said beam, means for scanning said beam over said target, a phosphor screen, means whereby said screen is scanned by an electron stream of intensity proportional to the intensity of said beam, said screen developing under action of said electron stream a wave band of light mainly outside the wave band to which said target is momentarily opaque and means for projecting onto said target light having a wave band mainly within that to which said target is momentarily opaque.

14. In a cathode ray device for portraying signals, means for producing a cathode beam, means for varying the intensity of said beam by said signals, a translucent target adapted to develop momentary opacity for a predetermined wave band of light upon bombardment by the electrons of said beam, means for scanning said beam over said target, a phosphor screen, means whereby said screen is scanned by an electron stream of intensity proportional to the intensity of said beam, said screen developing under action of said electron stream, light mainly outside the wave band to which said target is momentarily opaque, means for projecting onto said target light having a wave band mainly within that to which said target is momentarily opaque and means for viewing through said target said developed and projected light.

15. In a cathode ray device for portraying signals, means for producing a cathode beam, means for varying the intensity of said beam by said signals, a translucent target adapted to develop momentary opacity for a predetermined wave band of light upon bombardment by the electrons of said beam, means for scanning said beam over said target, a phosphor screen, means whereby said screen is scanned by a part of the electrons of said beam, said screen developing under action of said part of the electrons a wave band of light mainly outside the wave band to which said target is momentarily opaque, a second phosphor screen, and means for developing light in said second screen having a wave band mainly within that to which said target is momentarily opaque.

16. In a cathode ray device for portraying signals, means for producing a cathode beam, means for varying the intensity of said beam by said signals, a translucent target adapted to develop momentary opacity for a predetermined wave band of light upon bombardment by the electrons of said beam, means for scanning said beam over said target, a phosphor screen, means whereby said screen is scanned by a part of the electrons of said beam, said screen developing in the area under action of said part of the electrons a wave band of light mainly outside the wave band to which said target is momentarily opaque, and a second phosphor screen projecting its light onto said target having a wave band mainly within that to which said target is momentarily opaque.

17. In a cathode ray device for portraying signals, means for producing a cathode beam, means for varying the intensity of said beam by said signals, a translucent target adapted to develop momentary opacity for a predetermined wave band of light upon bombardment by the electrons of said beam, means for scanning electrons of said beam over and through said target, a phosphor screen adjacent said target adapted to receive the electrons passing therethrough and developing under action thereof light mainly outside the wave band to which said target is momentarily opaque, a second phosphor screen, means for developing light in said second screen having a wave band mainly within that to which said target is momentarily opaque, and means for viewing the light passing from said screens through said target.

HUMBOLDT W. LEVERENZ.

REFERENCES CITED

The following references are of record in the file of this patent:

UNITED STATES PATENTS

| Number | Name | Date |
|---|---|---|
| 2,096,986 | Ardenne | Oct. 26, 1937 |
| 2,163,918 | Schwartz | June 27, 1939 |
| 2,239,769 | Batchelor | Apr. 29, 1941 |

FOREIGN PATENTS

| Number | Country | Date |
|---|---|---|
| 514,776 | British | Nov. 17, 1939 |